US012710759B2

(12) United States Patent
Steiner et al.

(10) Patent No.: US 12,710,759 B2
(45) Date of Patent: Aug. 18, 2026

(54) DOOR OPENING DETECTION FOR A MOBILE ROBOT

(71) Applicant: Piaggio Fast Forward Inc., Boston, MA (US)

(72) Inventors: Brad Steiner, Boston, MA (US); Derek McColl, Melrose, MA (US)

(73) Assignee: Piaggio Fast Forward Inc., Boston, MA (US)

( * ) Notice: Subject to any disclaimer, the term of this patent is extended or adjusted under 35 U.S.C. 154(b) by 0 days.

(21) Appl. No.: 19/212,068

(22) Filed: May 19, 2025

(65) Prior Publication Data

US 2025/0355437 A1 Nov. 20, 2025

Related U.S. Application Data

(60) Provisional application No. 63/649,656, filed on May 20, 2024.

(51) Int. Cl.
*G05D 1/24* (2024.01)

(52) U.S. Cl.
CPC .................................... *G05D 1/24* (2024.01)

(58) Field of Classification Search
CPC ....................................................... G05D 1/24
USPC ........................................................ 701/423
See application file for complete search history.

(56) References Cited

U.S. PATENT DOCUMENTS

| | | | | |
|---|---|---|---|---|
| 11,409,296 | B1 | 8/2022 | Kim et al. | |
| 11,422,565 | B1 * | 8/2022 | Webster ............... | G05D 1/0088 |
| 2019/0120633 | A1 * | 4/2019 | Afrouzi ................ | G01C 21/206 |

OTHER PUBLICATIONS

Nikos C. Mitsou et al., "Temporal Occupancy Grid for mobile robot dynamic environment mapping," Mediterranean Conference on Control & Automation, dated Jul. 29, 2007, 8 pages.
European Patent Office, International Search Report, Application No. PCT/US2025/029998, dated Jul. 11, 2025, 13 pages.

* cited by examiner

*Primary Examiner* — Tiffany P Young
(74) *Attorney, Agent, or Firm* — Merchant & Gould P.C.

(57) ABSTRACT

Methods are disclosed that allow a robot, equipped with sensors and processors, to develop maps of its surroundings as it moves through a human environment, and to use these maps to detect and identify open doors, which it can then move through. Robots are disclosed to develop and use such maps to detect and identify open doors and move there-through.

24 Claims, 8 Drawing Sheets

DOOR OPENING DETECTION FOR A MOBILE ROBOT

CROSS-REFERENCE TO RELATED APPLICATIONS

This application claims the benefit of U.S. Provisional Application No. 63/649,656, filed May 20, 2024, entitled "Door Opening Detection for a Mobile Robot," which is assigned to the assignee hereof and is hereby incorporated herein by reference in its entirety.

TECHNICAL FIELD

The present invention relates to the navigation of human environments by mobile robots. Specifically, methods are disclosed for detecting doors as they open.

BACKGROUND ART

Door detection allows robots to navigate indoor environments more effectively. The ability to detect and navigate through doors is particularly important for service robots, which are increasingly being used in applications such as home assistance, healthcare, and hospitality. However, detecting doors accurately and reliably can be challenging, especially in complex environments where doors may be partially obscured, have non-standard shapes, or be located in unexpected places.

Prior art, such as U.S. Patent Application Publication No. US 2022/0308556 A1, has addressed this issue by proposing a system that uses sensors to detect doors based on their shape and position relative to the robot. This approach is based on the assumption that doors have a specific geometric shape that can be recognized by sensors, such as range finders or ultrasonic sensors. This approach may be effective in detecting standard doors, but may not work well for non-standard doors or doors that are partially obscured.

To address these limitations, researchers have explored computer vision-based approaches to door detection. Anguelov et al. in *IEEE International Conference on Robotics and Automation,* 2004. *Proceedings. ICRA* '04. 2004 (Vol. 4, pp. 3777-3784) proposed a system that uses a mobile robot equipped with a laser range finder and a camera to capture 3D data of the environment, which is then processed to identify door frames and estimate their pose. This approach can detect different types of doors, as it is based on visual cues rather than specific geometric features. However, such a computer vision-based approach is computationally demanding and may require large amounts of data to train accurate models, which can limit the applicability of this approach in real-world settings.

SUMMARY OF THE EMBODIMENTS

In accordance with some embodiments of the invention, a method is disclosed of detecting an open doorway by a robot in a current spatial position and orientation, the robot configured with a set of processors coupled to a set of sensors and a system for locomotion. In some embodiments, the method includes:

determining by the set of processors, based on data from the set of sensors, the current spatial position and orientation of the robot;

generating by the set of processors, using the set of sensors, a current occupancy map of a current area surrounding the robot, wherein the current occupancy map includes a current set of obstacles and a set of unobstructed views;

analyzing by the set of processors the current occupancy map to identify a potential open doorway in a potential door location;

retrieving by the set of processors, from a memory unit of the set of processors, a prior occupancy map previously stored by the set of processors, wherein the prior occupancy map is directed to a prior area then surrounding the robot in its prior spatial position, and includes a prior set of obstacles and a prior set of unobstructed views;

analyzing by the set of processors the current occupancy map and the prior occupancy map to identify the potential door location in the prior occupancy map, analyzing by the set of processors the potential door location in the prior occupancy map to determine if an obstacle is present in the prior occupancy map at the potential door location and if so, identifying the potential open doorway as an open doorway and the potential door location as a door location.

In some embodiments, the method further comprises repeating, in each of a plurality of successive sensor frames, the processes of generating the current occupancy map, analyzing the current occupancy map, retrieving by the set of processors, analyzing the current occupancy map and the prior occupancy map, and analyzing the potential door location.

In some embodiments, the method further comprises performing the repeating at a of at least one frame every ten seconds. In some embodiments, the frame rate is at least 10 frames per second. In some embodiments the frame rate is at least 60 frames per second.

In some embodiments, identifying the potential open doorway as an open doorway and the potential door location as a door location includes:

with respect to the current occupancy map, determining, by the set of processors, distances and angles from the current spatial position and orientation of the robot to the current set of obstacles and unobstructed views;

with respect to the prior occupancy map, determining, by the set of processors, distances and angles from the current spatial position and orientation of the robot to the prior set of obstacles and unobstructed regions; and analyzing the distances and angles to the current set of obstacles and unobstructed views in relation to the distances and angles to the prior set of obstacles and unobstructed views in order to determine if the obstacle is present on the prior occupancy map at the potential door location.

According to some embodiments, analyzing the distances and angles to the current set of obstacles and unobstructed views in relation to the distances and angles to the prior set of obstacles and unobstructed views includes using machine learning.

According to some embodiments, determining the distances and angles from the current position to the prior set of obstacles and unobstructed views includes raycasting from the current position on the current occupancy map, and determining the distances and angles from the current position to the prior obstacles and unobstructed views includes raycasting from the current position on the prior occupancy map.

According to some embodiments, the method includes cropping the prior occupancy map and the current occupancy map to reduce the area around the current position of the robot. According to some embodiments, the method includes denoising by the set of processors the current occupancy map before analyzing the current occupancy map and denoising by the set of processors the prior occupancy map before analyzing the prior occupancy map.

According to some embodiments, the method includes denoising by the set of processors further includes using, by the set of processors, computer vision techniques selected from the group consisting of erosion, dilation, connected component analysis, and combinations thereof.

According to some embodiments, wherein analyzing by the set of processors the current occupancy map to identify a potential open doorway in a potential door location further includes determining if a gap between obstacles is between a minimum and a maximum width and determining if no obstacles are detected for a threshold distance extending outward from the potential door location in a direction away from the current spatial position.

According to some embodiments of the invention, a robot includes:

- a system for locomotion;
- a set of sensors;
- a set of processors communicatively coupled to the system for locomotion and the set of sensors and configured to:
  - determine, based on data from the set of sensors, a current spatial position and orientation of the robot;
  - generate, using the set of sensors, a current occupancy map of a current area surrounding the robot, wherein the current occupancy map includes a current set of obstacles and a set of unobstructed views;
  - analyze the current occupancy map to identify a potential open doorway in a potential door location;
  - retrieve, from a memory unit of the set of processors, a prior occupancy map previously stored by the set of processors, wherein the prior occupancy map is directed to a prior area then surrounding the robot, and includes a prior set of obstacles and a prior set of unobstructed views;
  - analyze the current occupancy map and the prior occupancy map to identify the potential door location in the prior occupancy map;
  - analyze the potential door location in the prior occupancy map to determine if an obstacle is present in the prior occupancy map at the potential door location; and
  - identify, in response to determining that the obstacle is present in the prior occupancy map at the potential door location, the potential open doorway as an open doorway and the potential door location as a door location.

According to some embodiments, the set of processors is configured to repeatedly, in each of a plurality of successive frames, generate the current occupancy map, analyze the current occupancy map, retrieve the prior occupancy map, analyze the current occupancy map and the prior occupancy map, and analyze the potential door location. The frame rate may be at least one frame every ten seconds. The frame rate may be at least 10 frames per second. The frame rate may be at least 60 frames per second.

According to some embodiments, to identify the potential open doorway as an open doorway and the potential door location as a door location the set of processors is configured to:

- with respect to the current occupancy map, determine distances and angles from the current spatial position and orientation of the robot to the current set of obstacles and unobstructed views;
- with respect to the prior occupancy map, determine distances and angles from the current spatial position and orientation of the robot to the prior set of obstacles and unobstructed regions; and
- analyze the distances and angles to the current set of obstacles and unobstructed views in relation to the distances and angles to the prior set of obstacles and unobstructed views in order to determine if the obstacle is present on the prior occupancy map at the potential door location.

According to some embodiments, the set of processors is configured to use machine learning to analyze the distances and angles to the current set of obstacles and unobstructed view in relation to the distances and angles to the prior set of obstacles and unobstructed views. According to some embodiments, to determine the distances and angles from the current spatial position to the prior set of obstacles and unobstructed views the set of processors is configured to raycast from the current spatial position on the current occupancy map, and to determine the distances and angles from the current spatial position to the prior obstacles and unobstructed views the set of processors is configured to raycast from the current spatial position on the prior occupancy map.

According to some embodiments, the set of processors is configured to crop the prior occupancy map and the current occupancy map to reduce an area around the current spatial position of the robot.

According to some embodiments, the set of processors is configured to denoise the current occupancy map before analyzing the current occupancy map and denoise the prior occupancy map before analyzing the prior occupancy map. According to some embodiments, to denoise the current occupancy map and the prior occupancy map the set of processors is configured to use computer vision techniques selected from the group consisting of erosion, dilation, connected component analysis, and combinations thereof.

According to some embodiments, to analyze the current occupancy map to identify a potential open doorway in a potential door location the set of processors is configured to determine whether a gap between obstacles is between a minimum and a maximum width and determine whether any obstacles are detected for a threshold distance extending outward from the potential door location in a direction away from the current spatial position.

According to some embodiments, a method is disclosed of detecting an open doorway by a robot in a current spatial position, the robot configured with a set of processors coupled to a set of sensors and a system for locomotion. In some embodiments, the method includes:

1) setting, by the set of processors, a door opening count equal to zero;
2) generating by the set of processors, using the set of sensors, a current occupancy map of a current area surrounding the robot, wherein the current occupancy map includes a current set of obstacles and a set of unobstructed views;
3) analyzing by the set of processors the current occupancy map to identify a potential open doorway in a potential door location;
4) retrieving by the set of processors, from a memory unit of the set of processors, a prior occupancy map saved by the set of processors, wherein the prior occupancy map is directed to a prior area then surrounding the robot, and includes a prior set of obstacles and a prior set of unobstructed views;

5) analyzing by the set of processors the current occupancy map and the prior occupancy map to identify the potential door location in the prior occupancy map;

6) analyzing by the set of processors the potential door location in the prior occupancy map to determine if an obstacle is present in the prior occupancy map at the potential door location, and A) if an obstacle is present, incrementing the door opening count by one, and if the door opening count is greater than a threshold value, identifying the potential open doorway as an open doorway and the potential door location as a door location, and if the door opening count is less than the threshold value, repeating steps 4) through 6)

B) if an obstacle is not present, repeating steps 1) through 6).

According to some embodiments of the invention, a robot includes:

a system for locomotion;

a set of sensors;

a set of processors communicatively coupled to the system for locomotion and the set of sensors and configured to:

1) set a door opening count equal to zero;

2) generate, using the set of sensors, a current occupancy map of a current area surrounding the robot, wherein the current occupancy map includes a current set of obstacles and a set of unobstructed views;

3) analyze the current occupancy map to identify a potential open doorway in a potential door location;

4) retrieve, from a memory unit of the set of processors, a prior occupancy map saved by the set of processors, wherein the prior occupancy map is directed to a prior area then surrounding the robot, and includes a prior set of obstacles and a prior set of unobstructed views;

5) analyze the current occupancy map and the prior occupancy map to identify the potential door location in the prior occupancy map; and 6) analyze the potential door location in the prior occupancy map to determine if an obstacle is present in the prior occupancy map at the potential door location, and A) in response to an obstacle is present, increment the door opening count by one, and in response to the door opening count being greater than a threshold value, identify the potential open doorway as an open doorway and the potential door location as a door location, and in response to the door opening count being less than the threshold value, repeat steps 4) through 6), and B) in response to an obstacle not being present, repeat steps 1) through 6).

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
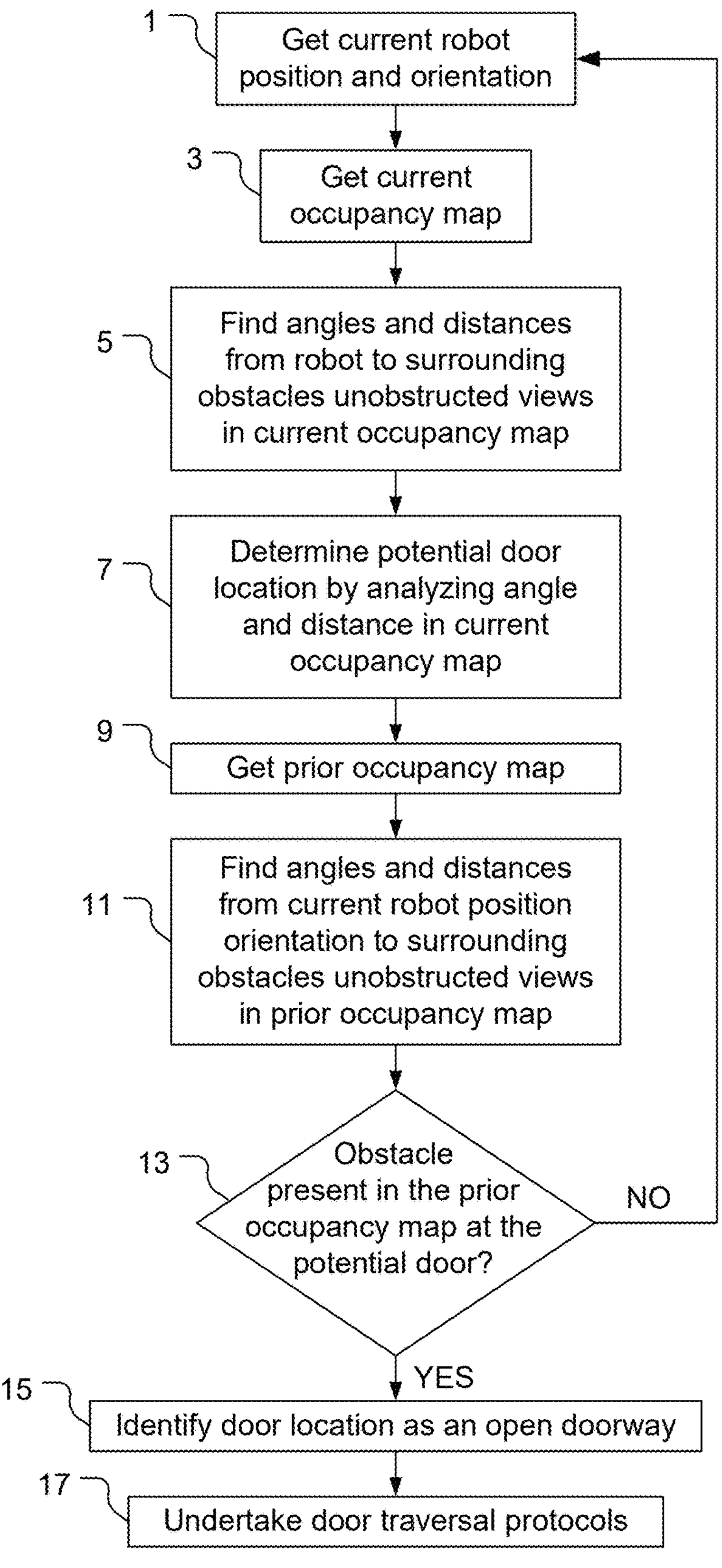
FIG. 1 summarizes a method for determining, by a robot, the presence of an opening doorway in accordance with an embodiment of the invention.

As used in this description and the accompanying claims, the following terms shall have the meanings indicated, unless the context otherwise requires:

A "set" includes at least one member.

A "doorway" is a gap between two walls or objects, having a width sufficient to allow a robot to move through the gap. A doorway may be open to allow a robot to move through the gap, or may be closed, to block movement through the gap.

An "image" is a set of pixels, organized as a "grid," obtained from the sensors on a robot, characterizing the presence or absence of obstacles in the area around the robot.

A "grid" is the arrangement of pixels forming an "image."

A "pixel" is a single unit of information on a "grid." The size of the "pixel" defines the resolution of the "image" formed by the "grid."

An "occupancy map" is a map constructed from sensors on a robot, which shows the location of objects detected by the sensors. Such occupancy maps are based on images, obtained by the robotic sensors of the region around the robot. Such occupancy maps may be determined as the robot moves through a space, and may be adjusted to provide absolute coordinates that are independent of the robot movement. Such occupancy maps, collected as a function of time, allow doorways to be detected and door opening events to be determined—as a prelude to door traversal.

A "cell" is a single unit of information on a "map" and corresponds to the "pixel" of an image. The size of the "cell" defines the resolution of the "map." Because a "map" is also an image, the "cell" of a "map" can also be considered a "pixel." Each cell of a map is determined to have a status of free space, occupied space, or unknown space as discussed below.

"Raycasting" is a means of determining distances from a position on an occupancy map to obstacles or unknown space in an occupancy map by tracing lines out from the position at various angles. Because an open door will allow rays to cast through it, while a closed door will block rays, raycasting at different time points can be used to identify a currently open (but previously closed) door and to determine door opening events.

"Raycasting" on a map starts with the single pixel on the map that represents the center point of the robot's sensor. A set of connected pixels generates a line with a specific angle, going from the pixel at the center of the robot's sensor to the edge of the map. In some embodiments, Bresenham's line formula is used to generate the set of connected pixels associated with the line.

To determine a distance to an obstacle, the set of processors on the robot proceeds pixel by pixel through such raycast lines, from the robot sensor outwards, until the status of that pixel changes from free space to occupied space, the occupied space corresponding to an obstacle, or from free space to unknown space, the unknown space corresponding to locations not observed by the robot's sensor. In response to this change, the pixel coordinate is recorded and the distance from that obstacle or unknown space to the center of the robot's sensor can be calculated and stored along with the angle of the line (e.g., relative to the robot). This process is repeated for multiple (e.g., all) angles in front of the robot that generate lines with different sets of pixels. This results in the set of distances and angles used to identify the potential door opening in the current occupancy map and the obstacle that is blocking that potential doorway in the prior occupancy map.

In human-centered environments, it is beneficial for robots to perceive and react to everyday activities. Specifically, it is beneficial for a mobile robot that travels through such environments to detect when a doorway is open and to decide when to move through it. For example, such a robot may use a set of on-board sensors and a set of processors to detect such doorways, determine when they are open, and navigate through them.

The ability to identify open doors and navigate through doorways is especially important for a robot, such as a GITA® robot, that may follow a human leader through doorways. For a following robot that cannot detect an opening door, it can be difficult or impossible for the leader to hold the door open while moving through the doorway far enough that the following robot also passes through the doorway. Under such circumstances, the leader may need to stop the following robot and push it through the doorway manually.

Herein, sensing and processing methods are disclosed that allow a mobile robot to identify a recently opened doorway. Such identification may be the first step if the mobile robot (especially a following robot) is to proceed through a doorway when a door opens—be it automatically, or be it by a leader holding the door open. FIG. 1 summarizes a method for determining, by a robot, the presence of an open doorway in accordance with an embodiment of the invention, the features of which will be further elucidated below. During the course of this method, the robot may be moving. The approach involves a determination of the current robot position and orientation (1) and generation of a current occupancy map (3) by a set of processors on a robot, based on signals received from a set of robotic sensors (although multiple processors and multiple sensors may be assumed in the description herein). The current occupancy map is then analyzed to find angles and distances from the robot to surrounding obstacles in the map (5) to identify a potential opening door in a door location (7). A prior occupancy map is retrieved from memory (9) and a comparison with the prior occupancy map is then made of angles and distances from the current robot location to surrounding obstacles, taking into account that the robot may have moved (11). If an obstacle is found to be present in the prior occupancy map at the potential door opening, then that opening is identified as a currently open doorway (13). If not, then a new current robot position and orientation is determined (1) and a new current occupancy map is generated (3), and the process is repeated. Once an open doorway is identified (15), doorway traversal protocols can be undertaken (17), for example as previously disclosed in issued U.S. Pat. No. 11,112,807.

Map Generation

Figure 2:
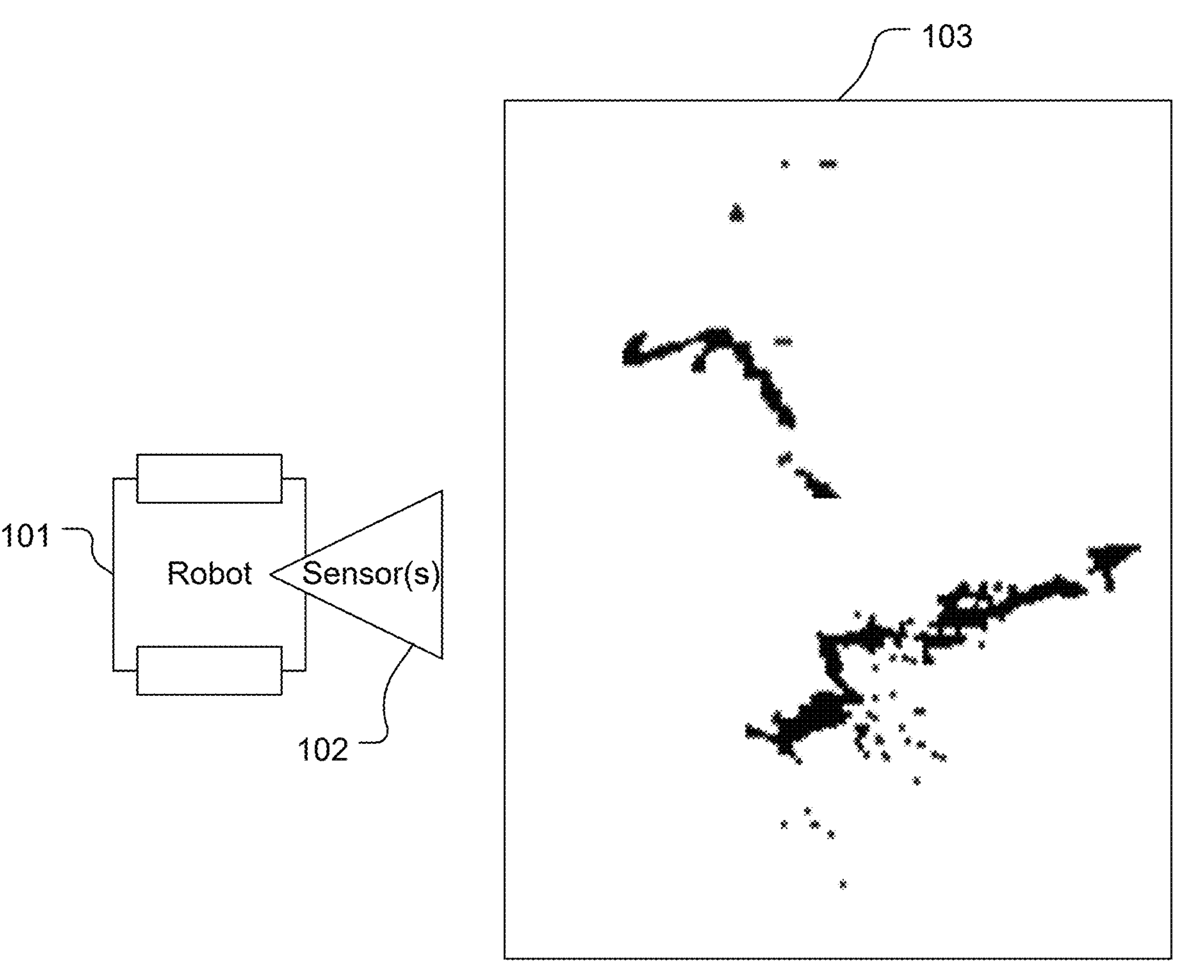
FIG. 2 is a top down view of a door detecting robot 101 and a 2D grid 103 it has mapped, in accordance with an embodiment of the invention.

FIG. 2 is a top down view of a door detecting robot 101 and a 2D grid 103 it has mapped, in accordance with an embodiment of the invention. According to this embodiment, 3D information of the scene is captured with depth/3D sensor(s) 102, e.g. a stereo camera, LIDAR, a time of flight camera, etc. This 3D data is represented in the form of a point cloud, where every point in the point cloud is represented by a set of coordinates (e.g., along perpendicular x, y, and z axes) that correspond to a location of something detected by the sensor(s) 102. This point cloud is then transformed into a 3D grid of cells (a 3D voxel grid), a process called voxelization. Each cell in the 3D voxel grid represents a cube of space with a side length of L. A cell is determined to be occupied if a threshold number of 3D points (from the point cloud) are found inside the cell.

According to another embodiment, 3D information can be generated by still 2D images by a process called 3D depth reconstruction. This process uses machine learning to estimate the 3D shape of a scene based on a single 2D camera image or a series of 2D camera images.

Map generation is continued by removing the floor from the 3D grid by ignoring the occupied cells at the bottom of each column in the 3D grid. The 3D voxel grid now contains all the observed objects in the scene, except the floor. This 3D grid is then transformed into a 2D grid by collapsing the 3D grid into a 2D grid, e.g., by combining all the remaining cells (after the floor being removed) in each column into a respective cell of a single 2D plane of cells, e.g., along the x and y axes. If any cell in a column is occupied, then the cell in the 2D plane is also identified as occupied.

As shown in FIG. 2, the 2D occupancy grid 103 is black for occupied cells, and blank for non-occupied cells. Structural features of objects in the 2D grid 103 are obscured because a number of the occupied cells correspond to sensor noise.

In one embodiment, a 2D occupancy grid is generated for every frame of data from the sensor, and changes as the robot moves and generates a new perspective on the environment. The data from the 2D grids and the changes in the robot's location and orientation are combined with statistical techniques, e.g., Thrun et al. 1998, to generate an occupancy map of the environment around the current position of the robot.

Figure 3:
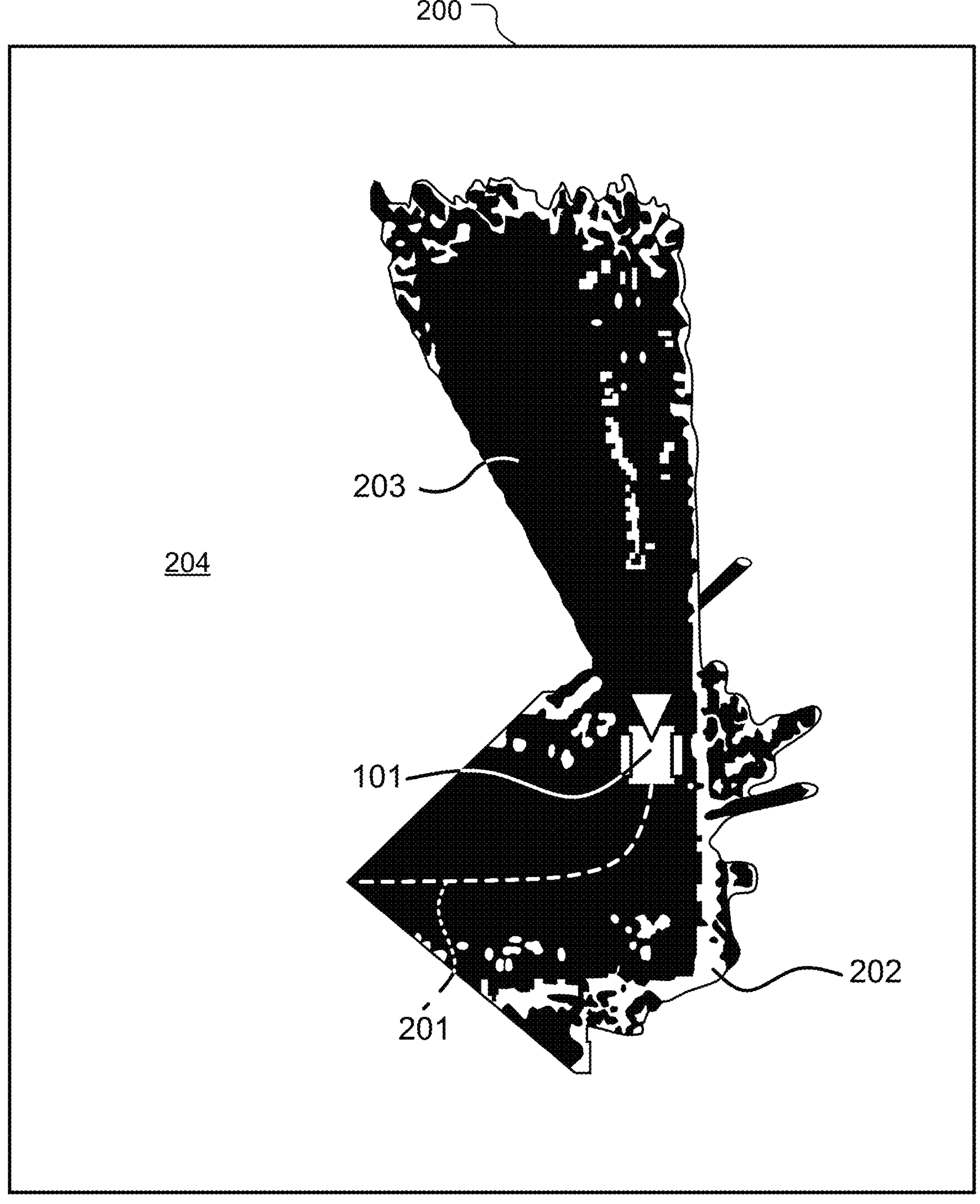
FIG. 3 is a sample occupancy map 200 generated by robot 101 of FIG. 2 in accordance with an embodiment of the invention.

FIG. 3 is a sample occupancy map 200 generated by robot 101 in accordance with an embodiment of the invention. Occupancy map 200 includes an observed area with detected objects 202 shown in white, free space shown in black 203, and an unobserved or unknown space 204 outside of the observed area. The robot's pathway 201 is tracked to combine the plurality of voxel grids, based on the robot's location when taking the snapshot voxel grid, into the occupancy map.

Door Opening Detection

Figure 4:
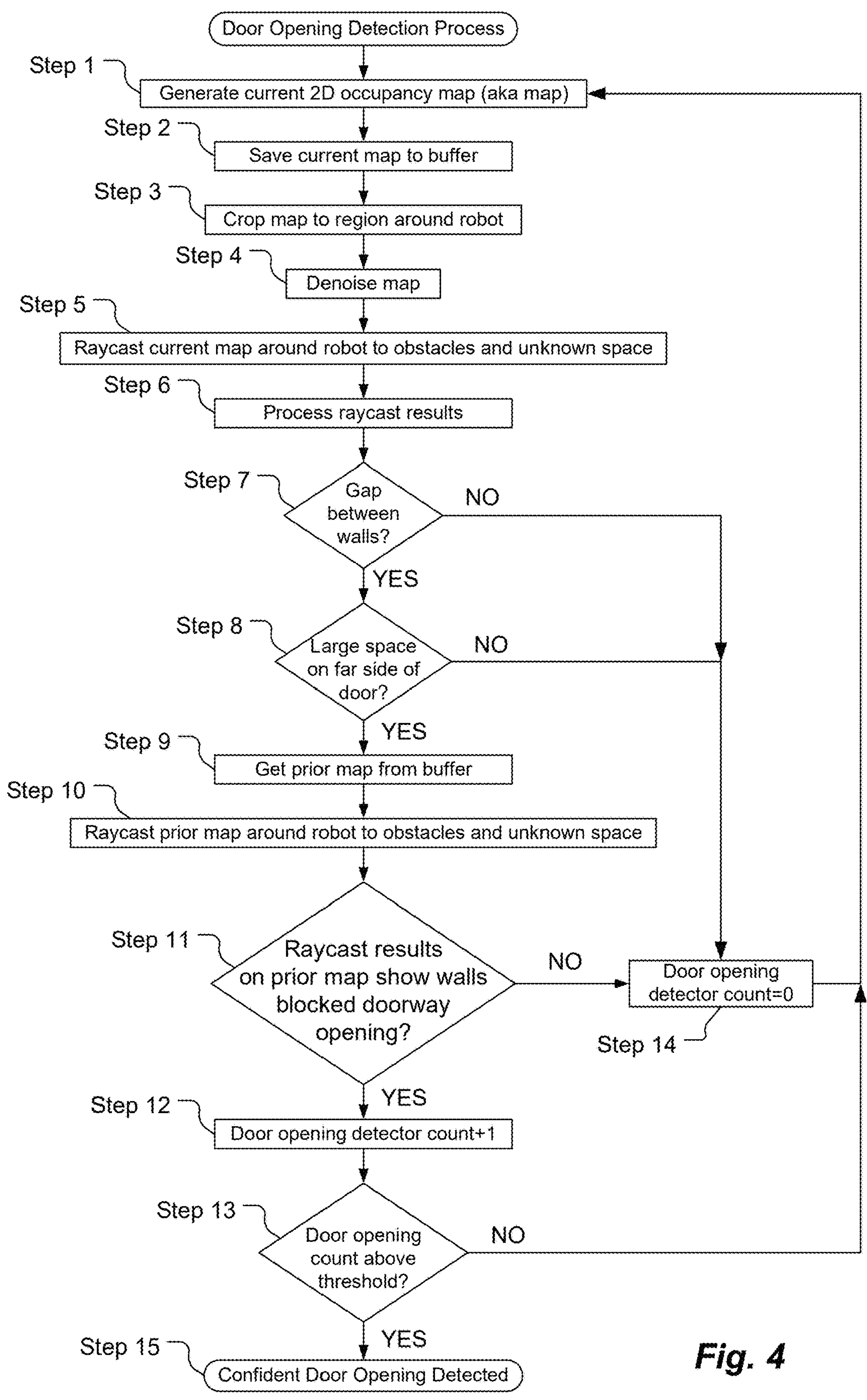
FIG. 4 is a flowchart of computer processes of robot 101 of FIG. 2 to detect a door opening, in accordance with an embodiment of the invention.

FIG. 4 is a flowchart of a method 400 of computer processes of robot 101 of FIG. 2 to detect a door opening, in accordance with one embodiment of the invention. The method 400 shown in FIG. 4 is consistent for detecting a door that swings in towards the robot, swings out away from the robot, double doors, sliding doors, elevator doors, and any other door that the depth/3D sensor detects as an object/obstacle when closed. The method 400 is, however, an example and not limiting. The method 400 may be altered, e.g., by having stages/steps added, removed, rearranged, combined, performed concurrently, and/or having single stages split into multiple stages. This method 400 is repeated, in real-time, on the robot's processor.

Prior to step 1 of the method 400, a door opening count operator is set equal to zero.

At step 1, the robot generates a current 2D occupancy map from the 3D grid, as in FIG. 3. Alternatively, a 3D occupancy map may be generated and can be used for similar purposes.

At step 2, the map is saved to a buffer (e.g., a memory as discussed below with respect to FIG. 10). The buffer is used to compare the current environment to the environment at a previous time. This way the robot can detect a change in the environment, such as an opening door. Optionally, at step 3, the map is cropped to include only the area around the robot. The optional cropping can be done to reduce memory usage and processing requirements for the robot's processor.

At step 4, the map is denoised. In this stage, the robot processes the resulting map to remove sensor noise, e.g., using computer vision techniques such as erosion, dilation, and connected component analysis. Denoising the map is also optional and may be used to improve detection rates compared to using the original maps.

Figure 5B:
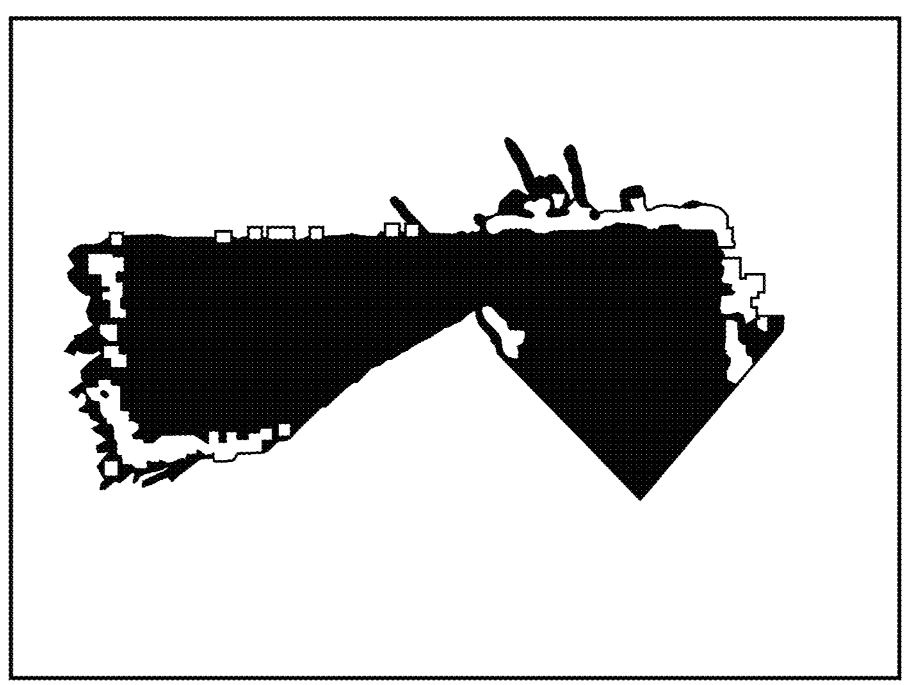
FIG. 5*b* is a representation of the 2D occupancy map of FIG. 2, without robot 101, after denoising, in accordance with an embodiment of the invention.
Figure 5A:
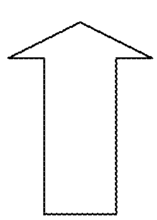
FIG. 5*a* is a representation of the 2D occupancy map of FIG. 2, without robot 101, before denoising, in accordance with an embodiment of the invention.
Figure 5A:
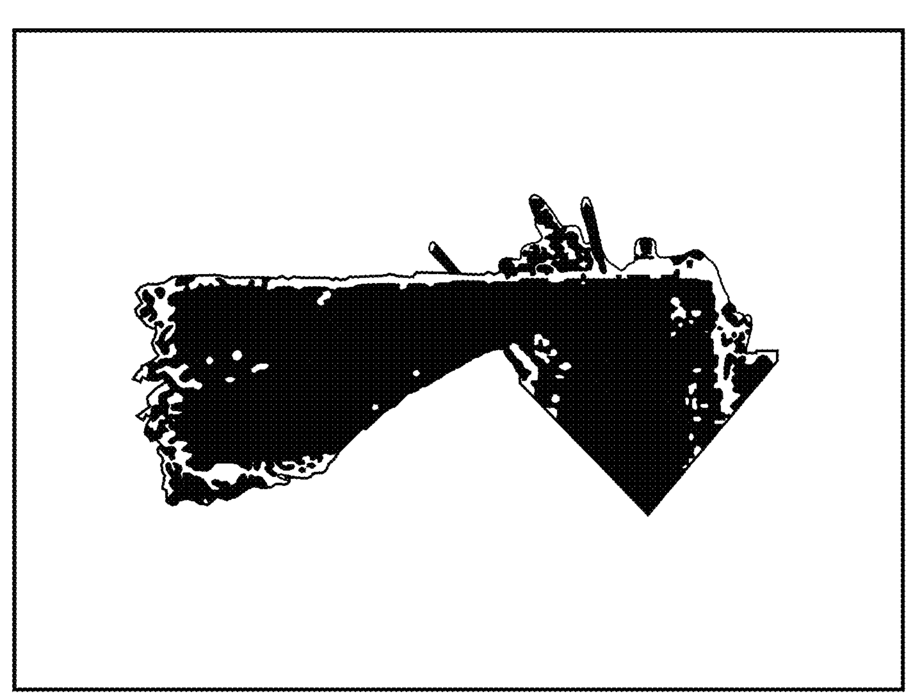

FIG. 5*a* is a representation of the 2D occupancy map of FIG. 3 before denoising. FIG. 5*b* shows the same 2D occupancy map after denoising, in accordance with one embodiment of the invention. As shown, the map after denoising provides a much crisper view of the surrounding area.

Referring back to FIG. 4, at step 5 the robot raycasts the current map. Raycasting is performed by tracing lines (rays) out from the robot at various angles. The rays extend through open space, until they hit an obstacle, or move into an unknown region beyond sensor detection. At step 6, processing of the raycasting results provides distances and angles from the robot to obstacles or unknown space in the map.

Figure 6:
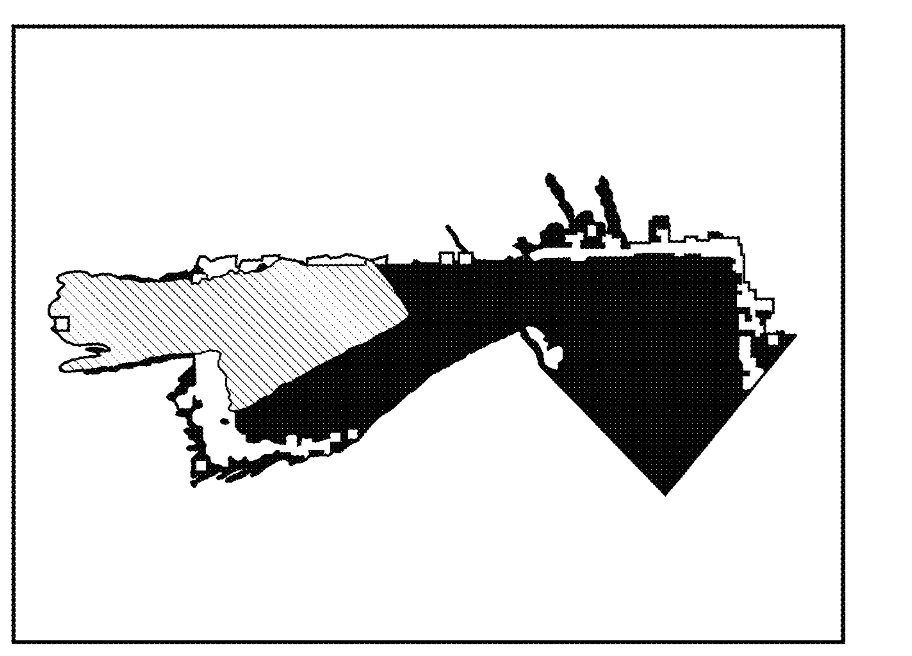
FIG. 6 is a map showing a raycasted area extending through a doorway after it has been opened, in accordance with an embodiment of the invention.

FIG. 6 is a map showing a raycasted area in cross-hatching, with rays extending through an open doorway in accordance with one embodiment of the invention. The angles and lengths of the rays are used to detect the open doorway.

Referring back to FIG. 4, at step 7 the robot's processor analyzes the determined distances and angles to determine if there is a gap between two walls, consistent with the size of a door (see below). If there is such a gap, and as determined in step 8, there is a large space on the far side of the gap, then the gap is identified as a potential door. If there is no gap (step 7), or there is no large space on the far side of the gap (step 8) then the door opening detector count is set equal to zero (step 14) and the method 400 beginning at step 1 is repeated.

Figure 7:
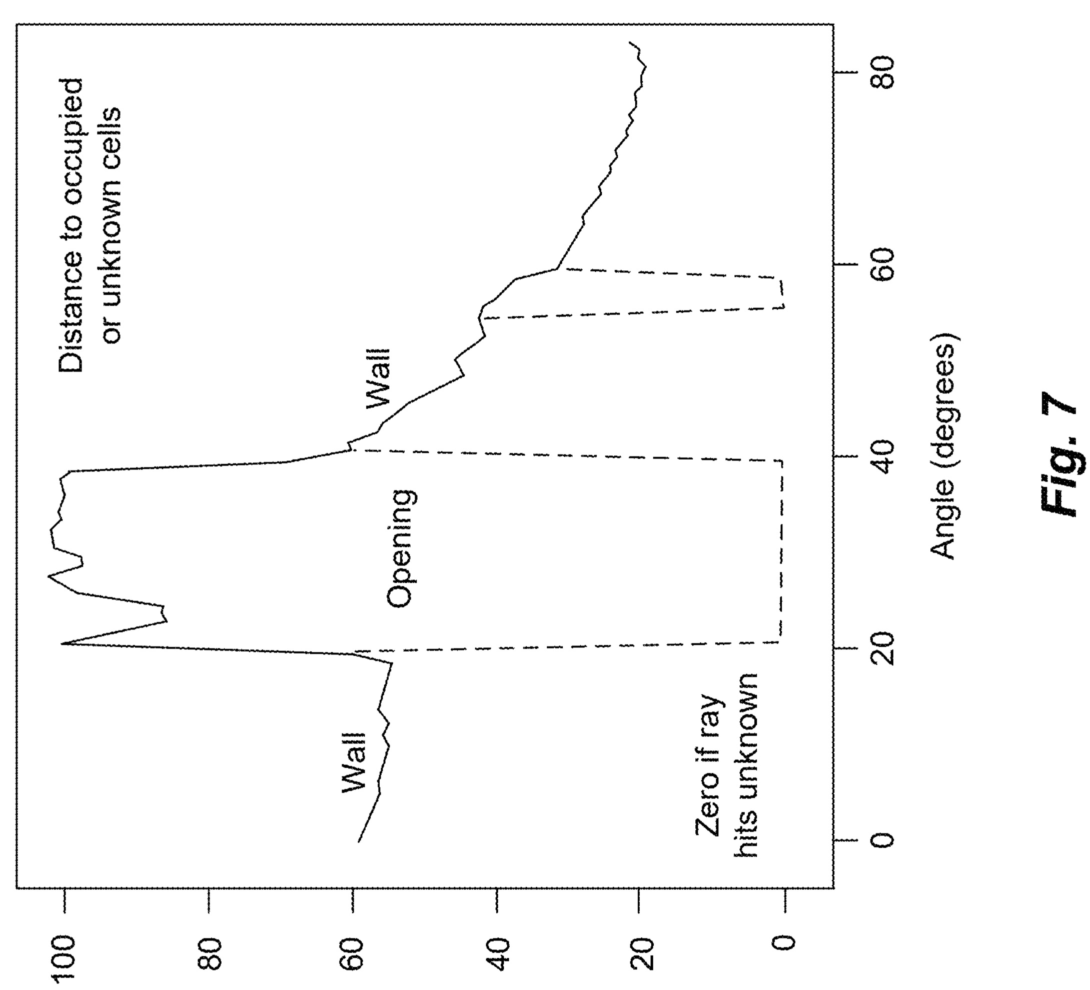
FIG. 7 is a graph of analyzed raycasting results corresponding to the raycasting of FIG. 6, in accordance with an embodiment of the invention.

FIG. 7 is a graph of analyzed raycasting results corresponding to the raycasting of FIG. 6, in accordance with one embodiment of the invention. The upper (solid) line shows the distance from the robot to occupied or unknown cells. The lower (dashed) lines portray gaps in the walls. Referring back to FIG. 4, in step 7, the widths of each gap, shown in FIG. 7, are compared to minimum and maximum widths for a doorway, to determine if the gap is consistent with a doorway. If a particular gap in the walls is within the width range of a doorway, it is identified as a potential doorway and the method 400 proceeds to step 8. If the robot does not identify any gap as a potential doorway then the door opening count is set equal to zero (step 14), a new current occupancy map is generated according to step 1, and the method 400 is repeated.

In step 8, the robot processor determines whether a raycasting distance on the far side of a potential doorway is larger than a threshold. If the raycasting distance is less than the threshold then a new current occupancy map is generated according to step 1, then the door opening count is set equal to zero (step 14) and the method 400 is repeated. If the raycasting distance is greater than the threshold, then the method 400 proceeds to step 9.

In step 9, the robot processor retrieves a prior map from the buffer. The prior map may be obtained from about 0.01 seconds to about 10 seconds prior to the current map. In step 10, the prior map is analyzed by raycasting to determine the distances and angles from the current position of the robot to obstacles or unknown space in the prior map.

Figure 9:
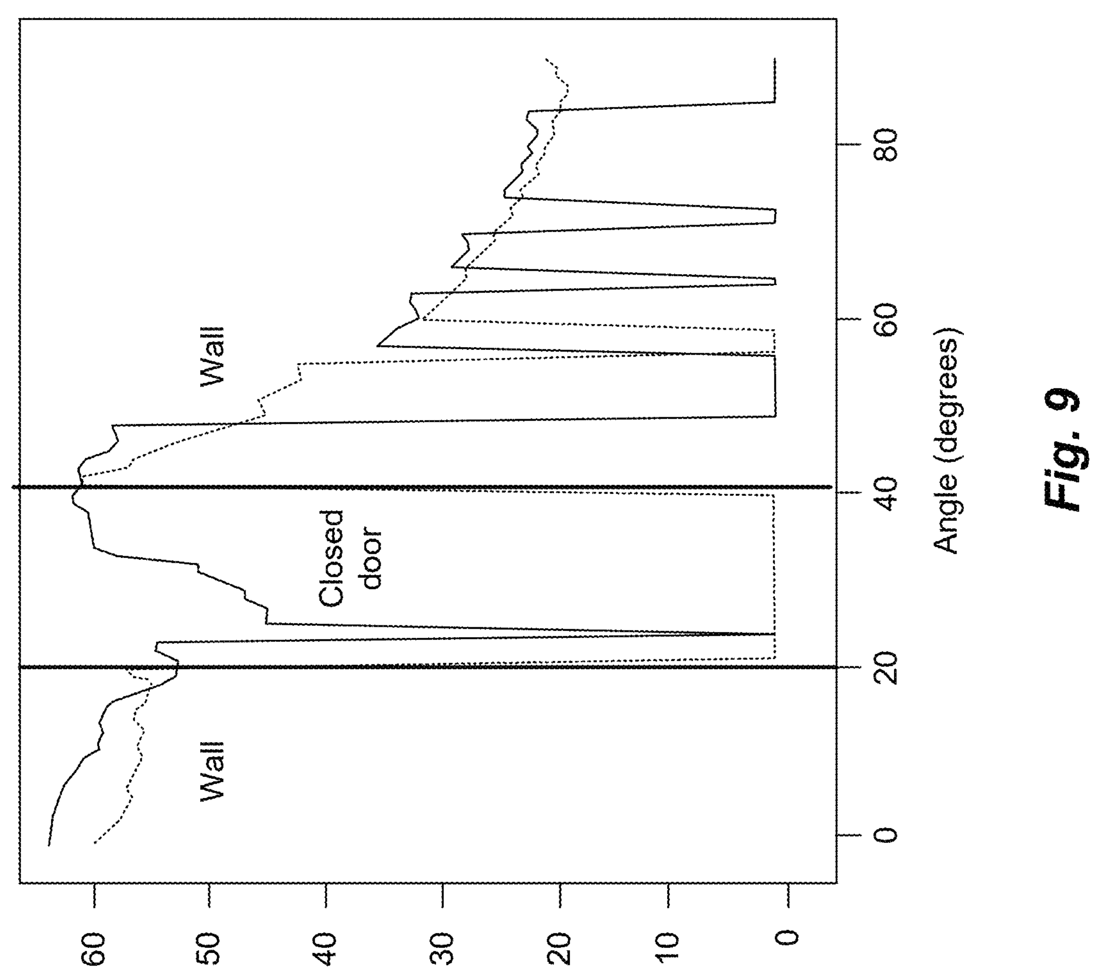
FIG. 9 is the resulting analysis from raycasting the map of FIG. 8, in accordance with one embodiment of the invention.
Figure 8:
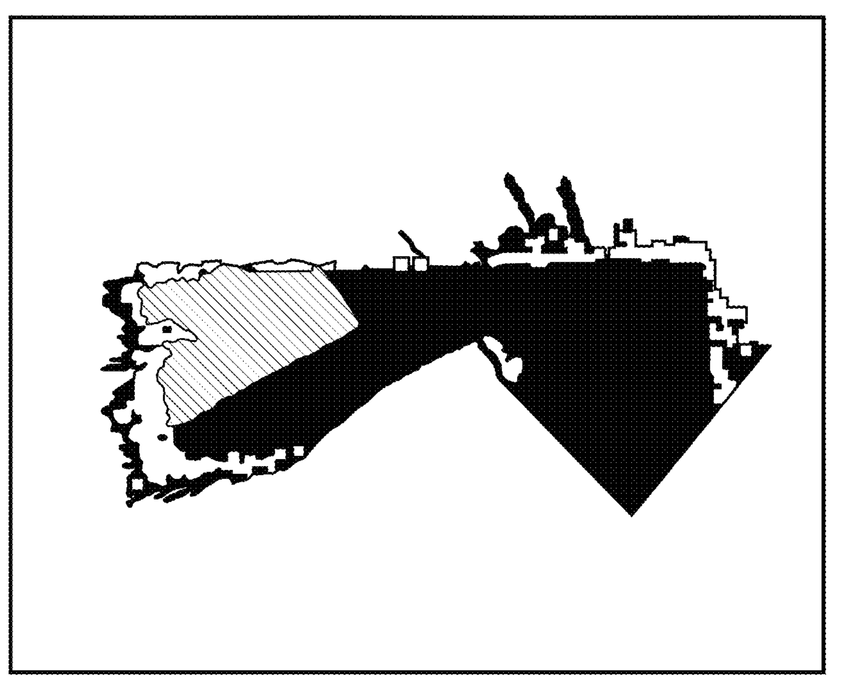
FIG. 8 is an earlier map showing raycasted lines extending up to but not traversing the doorway of FIGS. 5*a* and 5*b*, prior to its having been opened.

FIG. 8 is a sample prior occupancy map being raycasted, with a raycasted area shown in cross-hatching, and FIG. 9 is the resulting analysis from raycasting the prior occupancy map, in accordance with one embodiment of the invention. Referring to FIG. 4, in step 11, the robot processor analyzes the raycasting results on the prior map to determine if the opening was previously blocked by an obstacle (i.e., if the door was closed). If the opening was previously blocked, then the method 400 proceeds to step 12 and the door opening detector count operator is incremented by +1 and the method 400 proceeds to step 13. If the opening was not previously blocked, then the method 400 proceeds to step 14 and the door opening detector count operator is set to zero, a new current occupancy map is generated according to step 1, and the method 400 is repeated. In some embodiments, the frame rate of cycling through steps 1-7, 8, 11, or 13 is least one frame every 10 seconds. In some embodiments, the frame rate is at least 10 frames per second. In some embodiments, the frame rate is at least 60 frames per second.

In an embodiment, the analysis of raycasting results on the prior occupancy map to determine if the potential door was previously closed is performed by directly measuring the number of occupied cells detected in the potential door opening location in the prior occupancy map and confirming that the walls on either side of the doorway are the expected length. This method 400 determines the presence of an obstacle in the potential door opening by counting the number of occupied, free, and unknown map cells along the line connecting the left and right door points. If these values are within some predefined threshold then the robot processor determines the presence of a door, closed in the prior occupancy map, but open in the current occupancy map.

In another embodiment, the analysis of raycasting results is performed by supplying the raycast results from both current and prior occupancy maps as input to a machine learning model that classifies changes in the raycast results as a door opening or not a door opening. Compared to other machine learning models, the Random Forest model showed the best accuracy and performance. In an embodiment, a Random Forest model is trained on a collection of raycast data gathered from a robot observing a door opening, as well as simulated raycast data. In this embodiment additional training and processing steps may be performed to improve, e.g., maximize detection performance.

In step 13, if the door opening count is greater than a threshold value, then the potential doorway is identified as an open doorway and the method 400 proceeds to step 15. In some embodiments, the threshold value is zero. In some embodiments, in order to increase robustness and limit false positive door opening detection, the threshold value is +1 or greater. Once the potential doorway is identified as an open doorway at step 15, the robot is then situated to proceed through the open doorway as described for example in issued U.S. Pat. No. 11,112,807.

Figure 10:
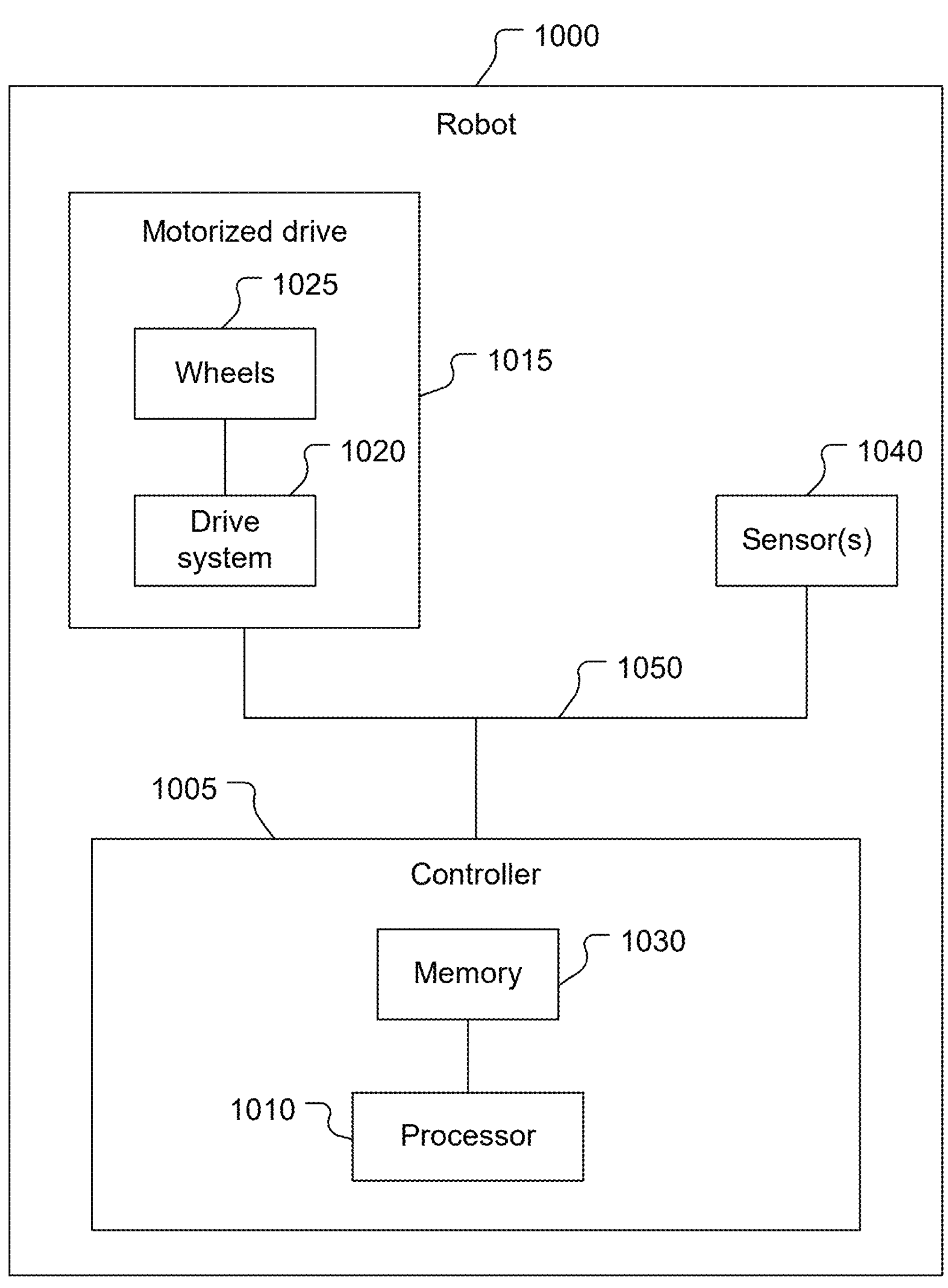
FIG. 10 is a block diagram of an example of a robot.

Referring also to FIG. 10, a robot 1000 includes a controller 1105 having memory 1030 and a set of processors 1010, a motorized drive 1015 including a drive system 1020 and wheels 1025, and a set of sensors 1040 communicatively coupled to each other by a bus 1050. The robot 101 is an example of the robot 1000. Even if referred to in the singular, a processor may include one or more processors, and a memory (or memory unit) may include one or more memories. The motorized drive 1015 is an example of a locomotion system and includes wheels 1025 that are used to move the robot 1000 in accordance with instruction provided by the controller 1005. The controller 1005 includes the set of processors 1010, and the memory 1030 may include one or more memories. The set of processor 1010 may include at least a portion of the memory 1030. The controller 1005 may include a set of hardware devices, e.g., a central processing unit (CPU), a microcontroller, an application specific integrated circuit (ASIC), etc. The controller 1005 may comprise multiple processors including a general-purpose/application processor, a Digital Signal Processor (DSP), a modem processor, a video processor, and/or a sensor processor. The memory 1030 may be a non-transitory, processor-readable storage medium that may include random access memory (RAM), flash memory, disc memory, and/or read-only memory (ROM), etc. The memory 1030 may store software which may be processor-readable, processor-executable software code containing instructions that are configured to, when executed, cause the controller 1005 (e.g., the set of processors 1010) to perform various functions described herein. Alternatively, the software may not be directly executable by the controller 205 but may be configured to cause the controller 205, e.g., when compiled and executed, to perform the functions.

Reference in this description to a processor (or set of processors) as performing a function includes other implementations such as wherein a set of processors executes instructions of software or firmware. The description herein may refer to a robot performing a function as shorthand for one or more appropriate components (e.g., the controller 1005 and the motorized drive 1015) of the robot 1000 performing the function.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of detecting an open doorway by a robot in a current spatial position and orientation, the robot configured with a set of processors coupled to a set of sensors and a system for locomotion, the method comprising:

determining by the set of processors, based on data from the set of sensors, the current spatial position and orientation of the robot;

generating by the set of processors, using the set of sensors, a current occupancy map of a current area surrounding the robot, wherein the current occupancy map includes a current set of obstacles and a set of unobstructed views;

analyzing by the set of processors the current occupancy map to identify a potential open doorway in a potential door location;

retrieving by the set of processors, from a memory unit of the set of processors, a prior occupancy map previously stored by the set of processors, wherein the prior occupancy map is directed to a prior area then surrounding the robot in its prior spatial position, and includes a prior set of obstacles and a prior set of unobstructed views;

analyzing by the set of processors the current occupancy map and the prior occupancy map to identify the potential door location in the prior occupancy map; and analyzing by the set of processors the potential door location in the prior occupancy map to determine that an obstacle is present in the prior occupancy map at the potential door location, and, in response thereto, identifying the potential open doorway as an open doorway and the potential door location as a door location.

2. The method of claim 1, further comprising repeating, in each of a plurality of successive sensor frames, the processes of generating the current occupancy map, analyzing the current occupancy map, retrieving the prior occupancy map, analyzing the current occupancy map and the prior occupancy map, and analyzing the potential door location.

3. The method of claim 2, further comprising performing the repeating at a frame rate of at least one frame every ten seconds.

4. The method of claim 3, further comprising performing the repeating at a frame rate of at least 10 frames per second.

5. The method of claim 3, further comprising performing the repeating at a frame rate of to at least 60 frames per second.

6. The method of claim 1, wherein identifying the potential open doorway as an open doorway and the potential door location as a door location includes:

with respect to the current occupancy map, determining, by the set of processors, distances and angles from the current spatial position and orientation of the robot to the current set of obstacles and unobstructed views;

with respect to the prior occupancy map, determining, by the set of processors, distances and angles from the current spatial position and orientation of the robot to the prior set of obstacles and unobstructed regions, and analyzing the distances and angles to the current set of obstacles and unobstructed views in relation to the distances and angles to the prior set of obstacles and unobstructed views in order to determine if the obstacle is present on the prior occupancy map at the potential door location.

7. The method of claim 6, wherein analyzing the distances and angles to the current set of obstacles and unobstructed views in relation to the distances and angles to the prior set of obstacles and unobstructed views includes using machine learning.

8. The method of claim 6, wherein determining the distances and angles from the current spatial position to the current set of obstacles and unobstructed views includes raycasting from the current spatial position on the current occupancy map, and wherein determining the distances and angles from the current spatial position to the prior set of obstacles and unobstructed views includes raycasting from the current spatial position on the prior occupancy map.

9. The method of claim 1, further comprising cropping the prior occupancy map and the current occupancy map to reduce the area around the current spatial position of the robot.

10. The method of claim 1, further comprising denoising by the set of processors the current occupancy map before analyzing the current occupancy map and denoising by the set of processors the prior occupancy map before analyzing the prior occupancy map.

11. The method of claim 10, wherein denoising by the set of processors further includes using, by the set of processors, computer vision techniques selected from the group consisting of erosion, dilation, connected component analysis, and combinations thereof.

12. The method of claim 1, wherein analyzing by the set of processors the current occupancy map to identify a potential open doorway in a potential door location further includes determining if a gap between obstacles is between a minimum and a maximum width and determining if no obstacles are detected for a threshold distance extending outward from the potential door location in a direction away from the current spatial position.

13. A robot comprising:

a system for locomotion;

a set of sensors;

a set of processors communicatively coupled to the system for locomotion and the set of sensors and configured to:

determine, based on data from the set of sensors, a current spatial position and orientation of the robot;

generate, using the set of sensors, a current occupancy map of a current area surrounding the robot, wherein the current occupancy map includes a current set of obstacles and a set of unobstructed views;

analyze the current occupancy map to identify a potential open doorway in a potential door location;

retrieve, from a memory unit of the set of processors, a prior occupancy map previously stored by the set of processors, wherein the prior occupancy map is directed to a prior area then surrounding the robot, and includes a prior set of obstacles and a prior set of unobstructed views;

analyze the current occupancy map and the prior occupancy map to identify the potential door location in the prior occupancy map;

analyze the potential door location in the prior occupancy map to determine if an obstacle is present in the prior occupancy map at the potential door location; and identify, in response to determining that the obstacle is present in the prior occupancy map at the potential door location, the potential open doorway as an open doorway and the potential door location as a door location.

14. The robot of claim 13, wherein the set of processors is configured to repeatedly, in each of a plurality of successive frames, generate the current occupancy map, analyze the current occupancy map, retrieve the prior occupancy map, analyze the current occupancy map and the prior occupancy map, and analyze the potential door location.

15. The robot of claim 14, wherein a frame rate is at least one frame every ten seconds.

16. The robot of claim 15, wherein the frame rate is at least 10 frames per second.

17. The robot of claim 15, wherein the frame rate is at least 60 frames per second.

18. The robot of claim 13, wherein to identify the potential open doorway as an open doorway and the potential door location as a door location the set of processors is configured to:

with respect to the current occupancy map, determine distances and angles from the current spatial position and orientation of the robot to the current set of obstacles and unobstructed views;

with respect to the prior occupancy map, determine distances and angles from the current spatial position and orientation of the robot to the prior set of obstacles and unobstructed regions; and analyze the distances and angles to the current set of obstacles and unobstructed views in relation to the distances and angles to the prior set of obstacles and unobstructed views in order to determine if the obstacle is present on the prior occupancy map at the potential door location.

19. The robot of claim 18, wherein the set of processors is configured to use machine learning to analyze the distances and angles to the current set of obstacles and unobstructed view in relation to the distances and angles to the prior set of obstacles and unobstructed views.

20. The robot of claim 18, wherein to determine the distances and angles from the current spatial position to the prior set of obstacles and unobstructed views the set of processors is configured to raycast from the current spatial position on the current occupancy map, and wherein to determine the distances and angles from the current spatial position to the prior obstacles and unobstructed views the set of processors is configured to raycast from the current spatial position on the prior occupancy map.

21. The robot of claim 13, wherein the set of processors is configured to crop the prior occupancy map and the current occupancy map to reduce an area around the current spatial position of the robot.

22. The robot of claim 13, wherein the set of processors is configured to denoise the current occupancy map before analyzing the current occupancy map and denoise the prior occupancy map before analyzing the prior occupancy map.

23. The robot of claim 22, wherein to denoise the current occupancy map and the prior occupancy map the set of processors is configured to use computer vision techniques selected from the group consisting of erosion, dilation, connected component analysis, and combinations thereof.

24. The robot of claim 13, wherein to analyze the current occupancy map to identify a potential open doorway in a potential door location the set of processors is configured to determine whether a gap between obstacles is between a minimum and a maximum width and determine whether any obstacles are detected for a threshold distance extending outward from the potential door location in a direction away from the current spatial position.

* * * * *